UNITED STATES PATENT OFFICE.

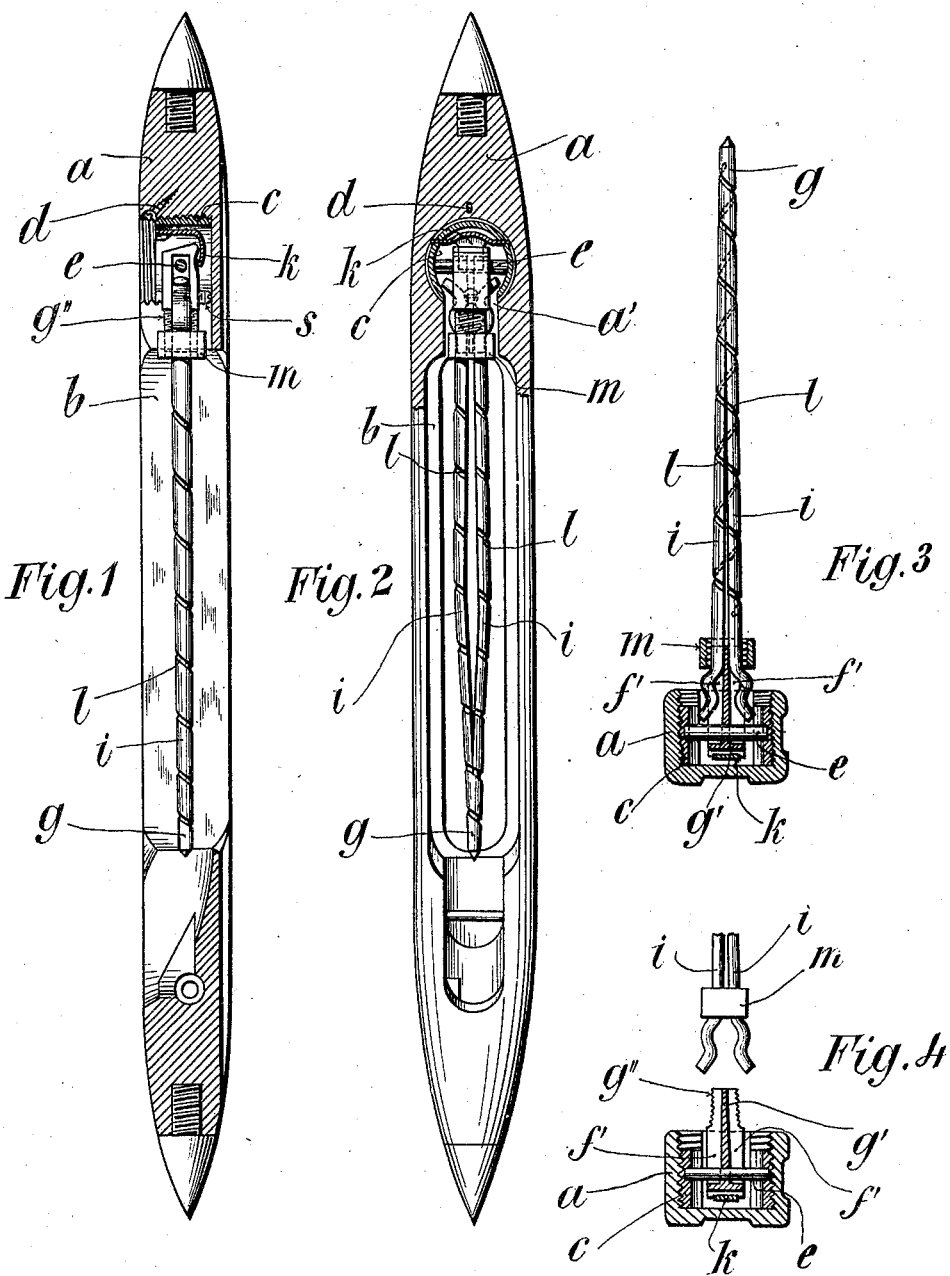

JOHANN RÜEGG, OF FELDBACH, NEAR ZURICH, SWITZERLAND.

LOOM-SHUTTLE.

984,971.   Specification of Letters Patent.   Patented Feb. 21, 1911.

Application filed November 8, 1909. Serial No. 526,805.

*To all whom it may concern:*

Be it known that I, JOHANN RÜEGG, a citizen of the Republic of Switzerland, residing at Feldbach, near Zurich, Switzerland, have invented certain new and useful Improvements in Loom-Shuttles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The subject of my invention is a loom shuttle provided with a flap-down spindle, which is capable of being expanded, so as to hold the cop or bobbin with a jamming action. The construction is such that the spindle is expanded only on being flapped down, so that when the spindle occupies its upright position the bobbin can be readily slipped over it; while on the spindle being then turned down into the body of the shuttle, it expands and firmly holds the bobbin. The spindle is preferably detachably mounted in the shuttle, so that it can be readily removed from the same.

One practical embodiment of the invention is represented in the accompanying drawing.

Figure 1 is a longitudinal section through the shuttle. Fig. 2 is a plan, partly in section. Fig. 3 is a cross section with the spindle in erect position, and Fig. 4 is a like view with detached spindle, a fragment only of which is shown.

Into the body $a$ of the shuttle there is screwed a socket $c$, which is held in position by a screw $d$ and at the side adjacent to the bobbin-chamber $b$ presents an opening. The socket $c$ supports a pin $e$, on which there is mounted a carrier $g'$ for the bobbin spindle $g$. The latter is partially split so as to present two shafts $i$, whose basal, free ends trend outward and fit loosely over the carrier $g'$, which is furnished with two lateral grooves $f'$ to receive them. The spindle is held to the carrier $g'$ by means of a square nut $m$, which takes over the threaded carrier-end $g''$ (Figs. 1–3). After the nut $m$ has been screwed off, the spindle $g$ can be removed from the carrier and replaced by a new one (Fig. 4). When the spindle occupies its upright position it is collapsed, *i. e.*, the shafts $i$ lie substantially together. If, however, the spindle is brought into the horizontal position the outwardly bent ends of the shafts $i$ bear against the edges of the walls at the opening in the socket $c$ and cause the more central portion of the shafts $i$ to bend outward, that is to say, the spindle is centrally bulged or expanded. In this position of the parts the spindle is prevented from being elevated by means of a spring $k$ secured within the socket $c$; the spindle is also hindered from turning by the square nut $m$, which fits into the recess $a'$ in the body of the shuttle.

Projecting from the carrier $g'$ there is a set-screw $s$ whose office it is to act as a stop and enable adjustment of the turned down spindle $g$ in precisely horizontal position (Fig. 1).

The outer wall of the spindle $g$ is furnished with a spiral thread $l$, running in the same direction as the unwinding yarn. When therefore a bobbin with a pasteboard spool is placed upon the spindle, the bobbin being rotated, the spool will screw onto the thread like a nut, and thus afford the bobbin such a firm hold on the spindle that it cannot slip off the latter owing to the shocks due to the strokes of the picker on the shuttle.

Since the spindle $g$ admits of ready detachment from the carrier $g'$, the former can be used directly as winding-spindle, which is of great advantage particularly in winding damp bobbins for wet weaving. The spindle in such case is secured to the bobbin-pin by means of the nut $m$, in the same manner as it is fastened to the carrier $g'$ in the shuttle. The pasteboard spool is then pushed over it and the yarn wound on. When the bobbin is full, the spindle with the bobbin on it is simply removed and set upon the carrier $g'$ in the shuttle.

Having now particularly described and ascertained the nature of the said invention and in what manner the same is to be performed, I declare that what I claim is:

1. In a loom shuttle, a chambered body, a flap-down recessed and threaded carrier pivotally mounted thereon, a spindle presenting two shafts whose basal ends fit into the slots in the carrier, a nut screwed on the carrier and holding the spindle to the latter, and means for causing central bulging of the shafts on the spindle being flapped down into the shuttle-body, substantially as described.

2. In a loom shuttle, a chambered body, a socket presenting a lateral opening secured therein, a flap-down recessed and threaded spindle-carrier pivotally mounted in the socket, a spindle presenting two shafts whose basal ends fit into the slots in the carrier and trend outward and on the spindle being flapped down into the spindle-body bear against the socket walls at the lateral socket-opening and cause central bulging of the shafts, and a nut secured to the carrier and holding the spindle to the latter, substantially as described.

3. In a loom shuttle, a chambered body, an expansible flap-down spindle mounted thereon and having an adjustment-screw protruding from it, adapted to butt against the shuttle base, on the spindle being flapped down, and means for expanding the spindle in its latter position, substantially as described.

In testimony that I claim the foregoing as my invention, I have signed my name in presence of two subscribing witnesses.

JOHANN RÜEGG.

Witnesses:
HERMANN GRAF,
CARL GUBLER.